United States Patent
Taylor et al.

(10) Patent No.: US 9,883,087 B2
(45) Date of Patent: Jan. 30, 2018

(54) OBJECTIVE FOR AN IMAGE RECORDING DEVICE

(71) Applicant: Swarovski-Optik KG., Absam (AT)

(72) Inventors: Clayton Taylor, Corpus Christi, TX (US); Verena Annina Bagusat, Innsbruck (AT)

(73) Assignee: Swarovski-Optik KG. (AT)

( * ) Notice: Subject to any disclaimer, the term of this patent is extended or adjusted under 35 U.S.C. 154(b) by 486 days.

(21) Appl. No.: 13/913,862

(22) Filed: Jun. 10, 2013

(65) Prior Publication Data
US 2013/0335626 A1   Dec. 19, 2013

(30) Foreign Application Priority Data
Jun. 11, 2012   (AT) .................. A 669/2012

(51) Int. Cl.
| | | |
|---|---|---|
| *H04N 5/225* | (2006.01) | |
| *G02B 15/12* | (2006.01) | |
| *G03B 17/48* | (2006.01) | |
| *G02B 23/16* | (2006.01) | |
| *G03B 17/56* | (2006.01) | |

(52) U.S. Cl.
CPC ........... *H04N 5/2254* (2013.01); *G02B 15/12* (2013.01); *G02B 23/16* (2013.01); *G03B 17/48* (2013.01); *G03B 17/565* (2013.01)

(58) Field of Classification Search
CPC .................................................. H04N 5/2254
USPC ....................................................... 348/374
See application file for complete search history.

(56) References Cited

U.S. PATENT DOCUMENTS

| | | | | |
|---|---|---|---|---|
| 4,323,304 A | * | 4/1982 | Ishii | A61B 1/00128 396/17 |
| 5,053,794 A | | 10/1991 | Benz | |
| 5,463,495 A | * | 10/1995 | Murg | F41G 1/38 359/399 |
| 5,583,602 A | * | 12/1996 | Yamamoto | G02B 7/28 396/133 |
| 5,619,378 A | * | 4/1997 | Schwab | G02B 23/10 359/428 |
| 5,715,607 A | * | 2/1998 | Murg | F41G 1/345 33/334 |
| 5,771,623 A | * | 6/1998 | Pernstich | F41G 1/38 356/3.03 |

(Continued)

FOREIGN PATENT DOCUMENTS

| | | |
|---|---|---|
| DE | 2848605 A1 | 5/1980 |
| DE | 20005152 U1 | 6/2000 |

(Continued)

*Primary Examiner* — Antoinette Spinks
(74) *Attorney, Agent, or Firm* — Lerner, David, Littenberg, Krumholz & Mentlik, LLP

(57) ABSTRACT

The invention relates to an objective for an image recording device for reproducing an image, which is created by a far-optical device. A housing, which is detachably connectable to an eyepiece of the far-optical device, has a greater inner diameter than the exterior diameter of an eyepiece housing. Both an exit pupil of the far-optical device and an entrance pupil of the objective are situated inside the housing. The objective has at least one lens, the optical axis of which is arranged to be parallel to the optical axis of the eyepiece of the far-optical device and to the middle axis of the eyepiece housing.

17 Claims, 5 Drawing Sheets

(56) References Cited

U.S. PATENT DOCUMENTS

Figure 1:
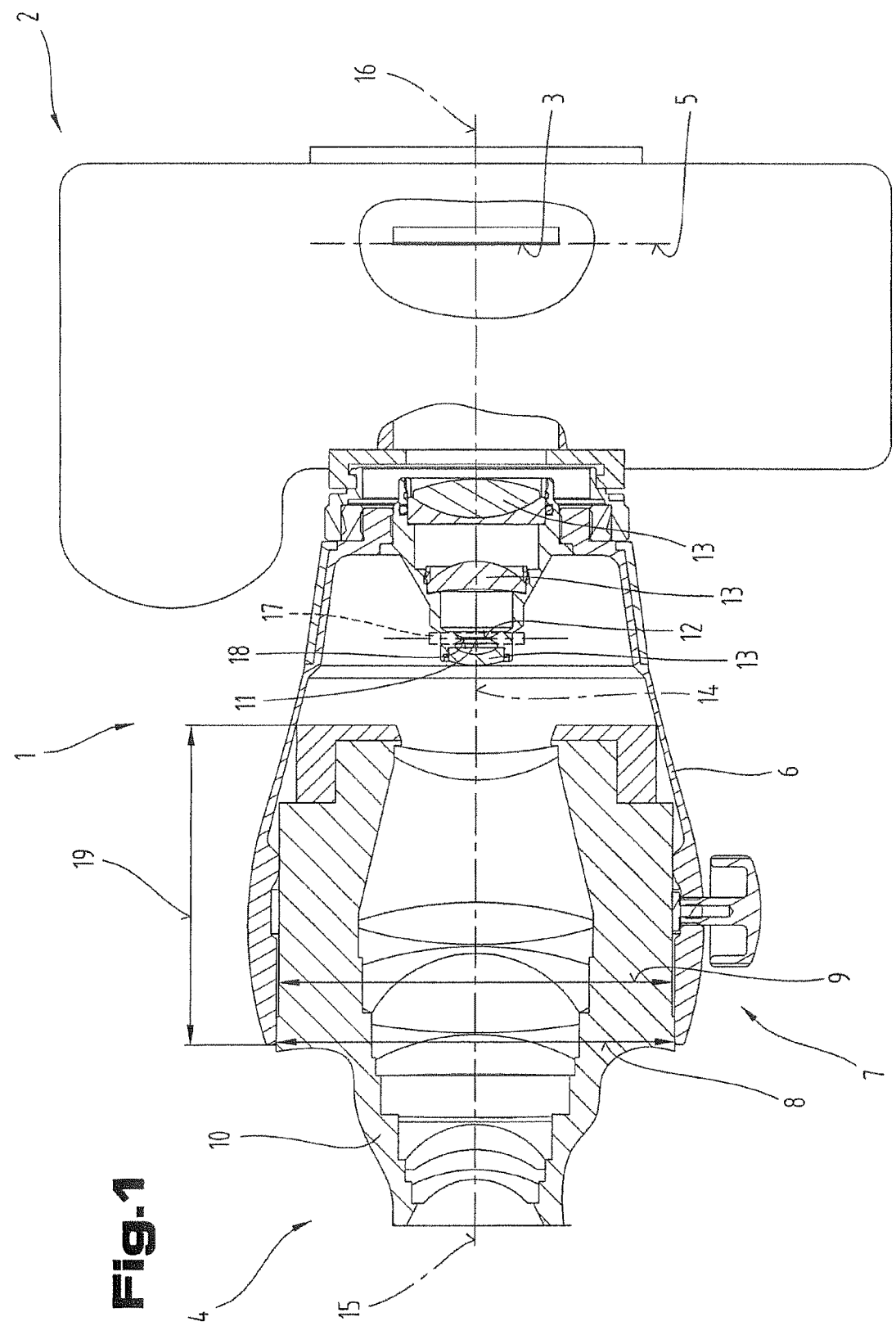

| | | | | |
|---|---|---|---|---|
| 6,069,651 | A * | 5/2000 | Tsuyuki | G02B 23/2484 348/65 |
| 7,913,440 | B2 * | 3/2011 | Murg | F41G 1/38 42/122 |
| 8,958,149 | B2 * | 2/2015 | Hesse | F41G 1/38 359/399 |
| 2010/0238542 | A1 * | 9/2010 | Fiedler | G02B 23/145 359/422 |
| 2011/0242675 | A1 * | 10/2011 | Sugita | G02B 15/173 359/676 |
| 2012/0066539 | A1 * | 3/2012 | Oikawa | H04N 5/23209 713/600 |

FOREIGN PATENT DOCUMENTS

| | | |
|---|---|---|
| EP | 0031151 A2 | 7/1981 |
| EP | 0058020 A1 | 8/1982 |
| JP | H10288736 A | 10/1998 |
| JP | 2003029166 A | 1/2003 |
| JP | 2003315685 A | 11/2003 |
| JP | 2007193081 A | 8/2007 |
| JP | 2010102026 A | 5/2010 |
| WO | 2005103792 A1 | 11/2005 |

* cited by examiner

OBJECTIVE FOR AN IMAGE RECORDING DEVICE

The invention relates to an objective for an image recording device for reproducing an image of a picture on an image recording face, which picture is created by a far-optical device.

By a far-optical device, in this document optical imaging systems are meant, which allow a magnified reproduction of objects that are at larger distances, such as e.g. binoculars, telescopes, optical aiming and target devices.

Image recording device means photo-technical apparatus storing static or moving pictures to a photographic film or storing electronically via a sensor recorded signals, in particular conventional or digital cameras that have an interface for an objective bayonet.

From DE 20 005 152 U1, an adapter for connecting an image recording device having an optical device, in particular a microscope, has been known. One side of the known adapter may be connected to an objective of an image recording device and the other side can be connected to an eyepiece of an optical device.

The disadvantage of the known device is that apart from the objective of the image recording device, an additional device in the form of an adapter is required in order to connect the image recording device to the optical device.

A further disadvantage of the known device is that the image quality is affected even if a further lens is used in the adapter, as an exact alignment of three lens systems in one optical axis with respect to the optical axis of the image recording device is required and aberrations are increased.

From the U.S. Pat. No. 5,053,794 an adapter ring has been known that may be mounted between an SLR camera housing, SLR objectives or video cameras and an optical device.

The essential disadvantage of this known device should be seen in the fact that using the chosen arrangement it cannot be guaranteed that the exit pupil of the optical device, as well as the entrance pupil of the objective lay within a region inside the objective.

It is thus the underlying objective of the present invention to propose an objective which can be directly connected with an image recording device and can simply be detachably connected to a far-optical device and which nevertheless ensures that the reproduction of an image created by the far-optical device on an image recording face of the image recording device is performed in optimum size and intensity or image brightness.

This objective is achieved by the fact that a housing, which may by connected to the eyepiece of a far-optical device, has a greater inner diameter than the external diameter of an eyepiece housing and both an entrance pupil of the far-optical device and an entrance pupil of the objective are situated inside the housing and the objective has at least one lens, the optical axis of which is arranged to be parallel to the optical axis of the eyepiece of the far-optical device and to the center axis of the eyepiece housing. The solution according to the invention allows quickly connecting an image recording device to a far-optical device and ensuring a high-quality reproduction of the image on the image recording face due to an integrated optics.

According to the invention, the objective can nevertheless be achieved by a housing that is detachably connected to an eyepiece of the far-optical device and has a greater inner diameter than the external diameter of an eyepiece housing is and at least one intersection of centroids of at least two beams of rays is inside the housing and the objective has at least one lens, the optical axis of which is arranged to be parallel to the optical axis of an eyepiece of the far-optical device and to the center axis of the eyepiece housing and the intersection is arranged on a side of a lens nearest the image recording face which side is opposite the image recording face.

An advantageous variant of the embodiment is that the entrance pupil of the far-optical device as well as the entrance pupil of the objective or the intersection of the centroids of at least two beams of rays inside the housing is in a region which is limited by two planes which are situated perpendicularly to the optical axis and have a longitudinal distance of less than 5 mm with respect to the optical axis.

According to another variant, it is possible for a diaphragm to be arranged in this region of the plane.

According to another variant of the invention, the object can have a fixed focal length of less than 100 mm, preferably between 40 and 20 mm. This way, a sufficiently large reproduction on the image recording face is ensured.

In another particularly advantageous embodiment, the objective has a fixed focal length of 30 mm. It is thus possible to achieve a short constructional length of the objective lens in addition to the optimal reproduction size.

It is furthermore possible that it is provided for the housing to have a greater inner diameter than the external diameter of the eyepiece housing is. This ensures an improved variability for the usage of the objective together with several, different far-optical devices and an improved mechanical connection by overlapping both devices may be guaranteed.

A particular variable connection between the objective and a far-optical device can be achieved by the possibility to detachably connect the housing to the far-optical device via an interface that may be detachably connected to the eyepiece housing. It is thus possible to precisely connect several far-optical devices to the objective.

According to a further embodiment of the invention, the housing may be detachably connected to the far-optical device or to the interface via a fixing device. The fixing device may be formed from a clamping or tensioning device, in particular from a clamping screw or a quick-locking device. It is thus ensured that a sufficiently defined mounting and fixing of the housing to the eyepiece housing or of an interface to the eyepiece housing of the far-optical device may be realized.

An embodiment of the objective provides that the latter may be detachably connected to the image recording device via an objective bayonet. It is thus possible to quickly exchange the objectives at the image recording device. In addition, the force- and form-locking connection ensures the fixation at the image recording device.

Another variant of the invention provides that the objective bayonet may be detachably connected to the housing via a thread having a diameter of 42 mm and a lead of 0.75 mm. It is thus ensured that it is possible for the different objective bayonets for different image recording devices to be connected to the housing and that it is thus allowed for the objective to be connected to very different image recording devices.

According to a further advantageous embodiment, the exit pupil of the far-optical device is arranged between a negative lens and a positive lens in the objective. This results in an optimal reproduction quality on the image recording face.

In a further, very advantageous embodiment, the entrance pupil of the objective is also disposed between the negative lens and the positive lens. It is thus possible to ensure for the field of view made available by the far-optical device to be reproduced on the image recording face in full scale at highest image quality and highest intensity or image brightness.

In a further, very advantageous variant of the embodiment, a centering device and a longitudinal positioning device are arranged at the housing. Due to these two devices it is possible to optimally align the objective with respect to the optical axis of the far-optical device. Due to the longitudinal positioning device, it is ensured to exploit intensity in the best possible manner.

The solution according to the invention allows aligning the objective with respect to the far-optical device in a particularly easy way by a circular stop face being embodied at the end face of the housing. It is thus possible to achieve an optimal alignment with respect to the eyepiece housing or to an interface with a corresponding stop face.

A particularly advantageous embodiment of the device may be achieved if the housing is embodied to be bell-shaped and has a smallest external diameter at an end region facing the image recording device. It is with this embodiment possible to realize an optimal mounting of the housing at the eyepiece housing or at the interface. It is additionally possible to increase variability, because a connection to very different eyepiece housings may be realized. Together with the fixing device it is possible to establish a stable and not over-determined connection between the objective and the far-optical device.

In a particularly advantageous embodiment of the invention, at least one interface for electronic data transfer from and to the far-optical device is disposed at the housing. Due to the arrangement of such an interface for electronic data transfer, it is possible to transfer e.g. distance measurement data, zoom and/or focusing settings from the far-optical device to the image recording device, it is likewise also possible to transfer settings and commands from the image recording device to the far-optical device.

In a further variant of the embodiment, an objective optics is formed from the positive lens at the side facing the far-optical device, by a cemented element from a negative and a positive lens, at the side facing the image recording device and the positive lens arranged between. This arrangement of different optical components to be an objective optics ensures a high-quality reproduction of the image on the image recording face of the image recording device.

For a better understanding of the invention the latter is explained in more detail with reference to the following figures.

Figure 2:
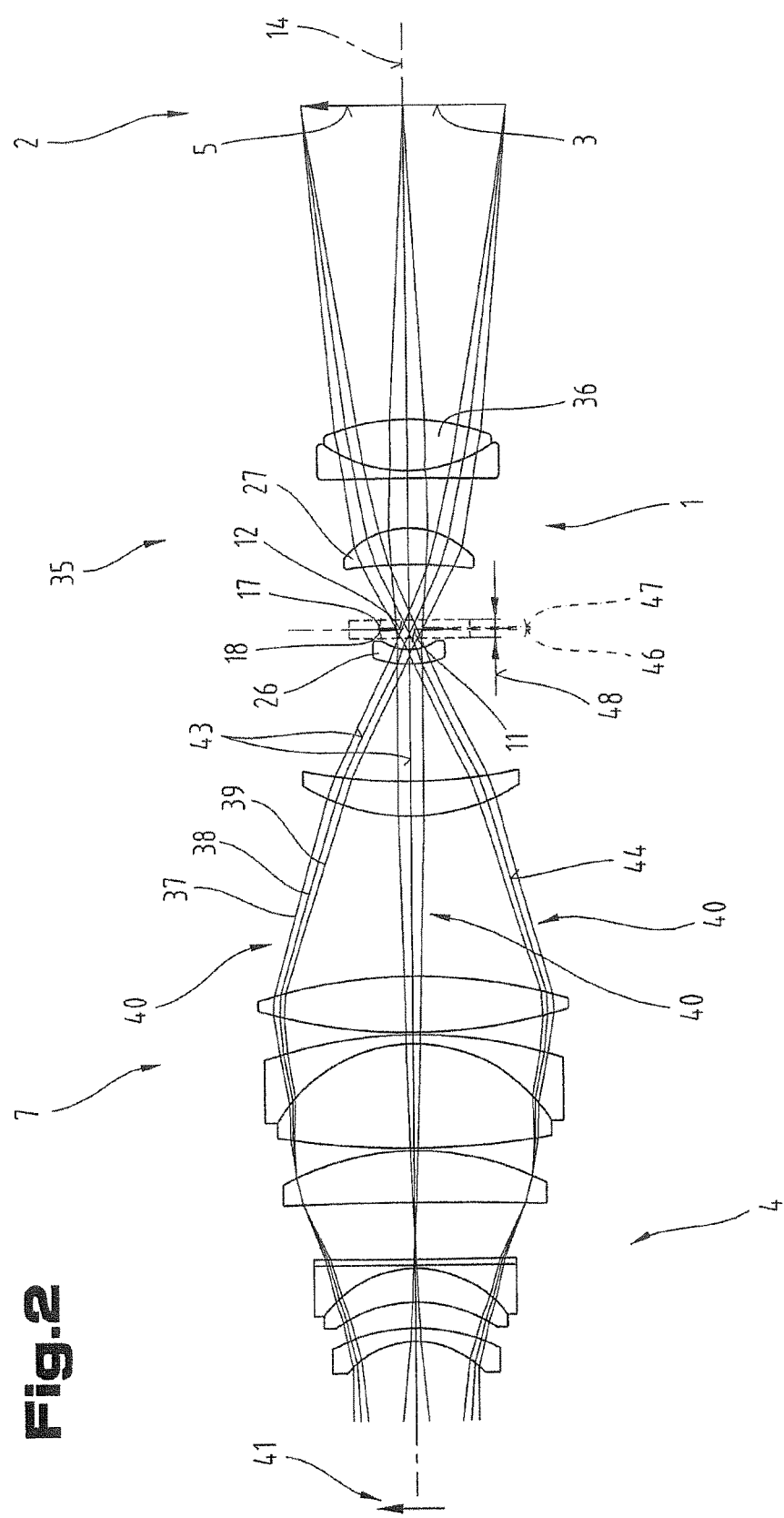
Figure 3:
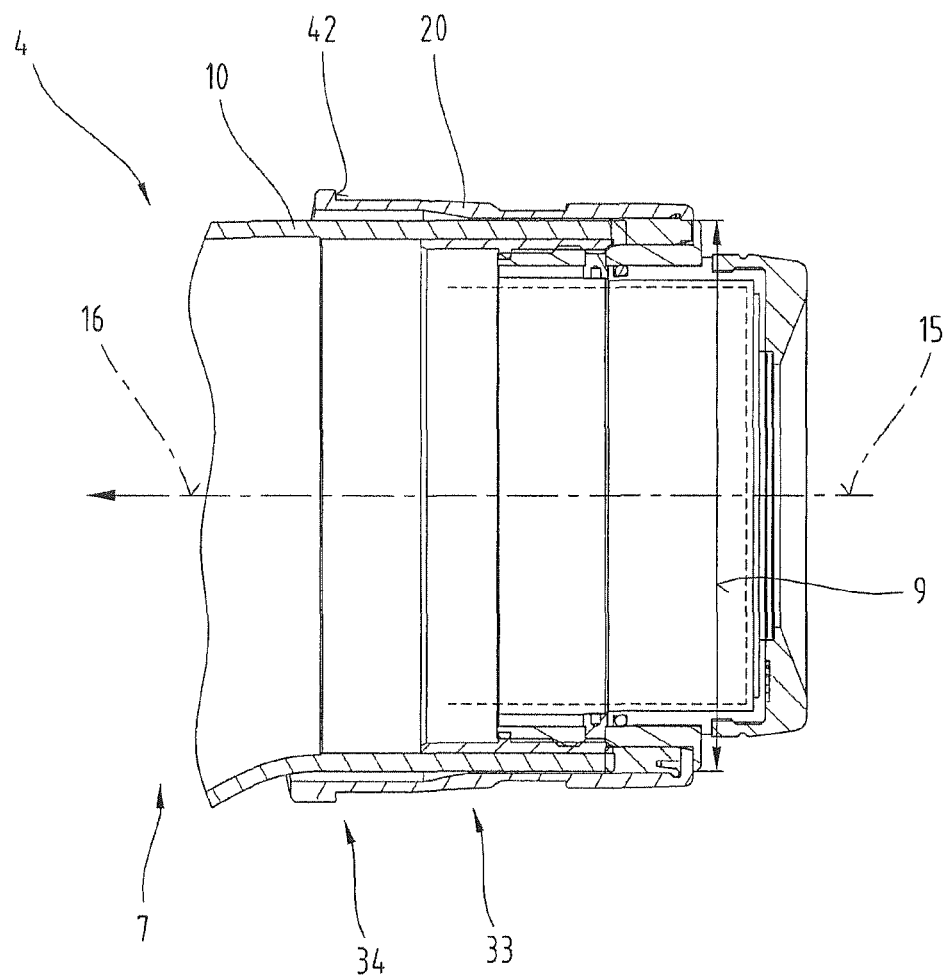
Figure 4:
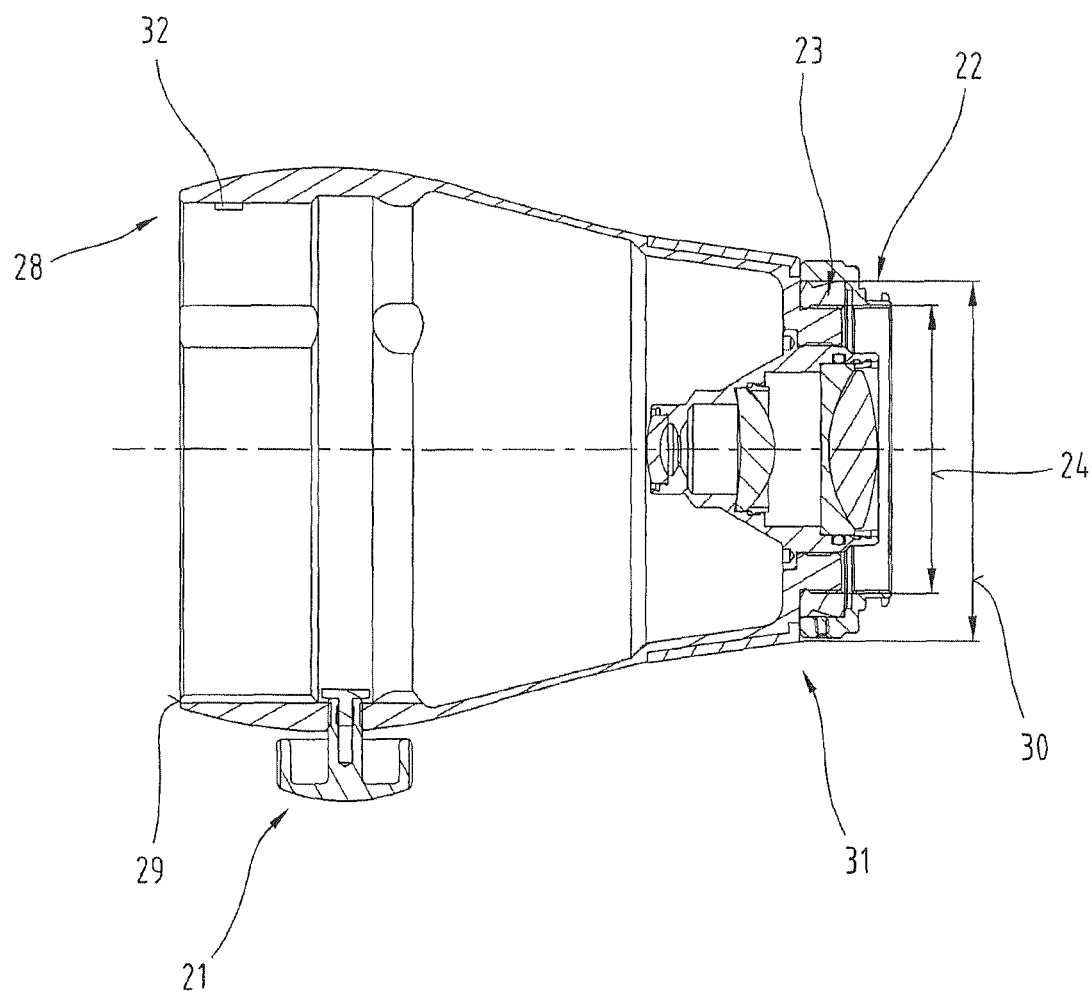
Figure 5:
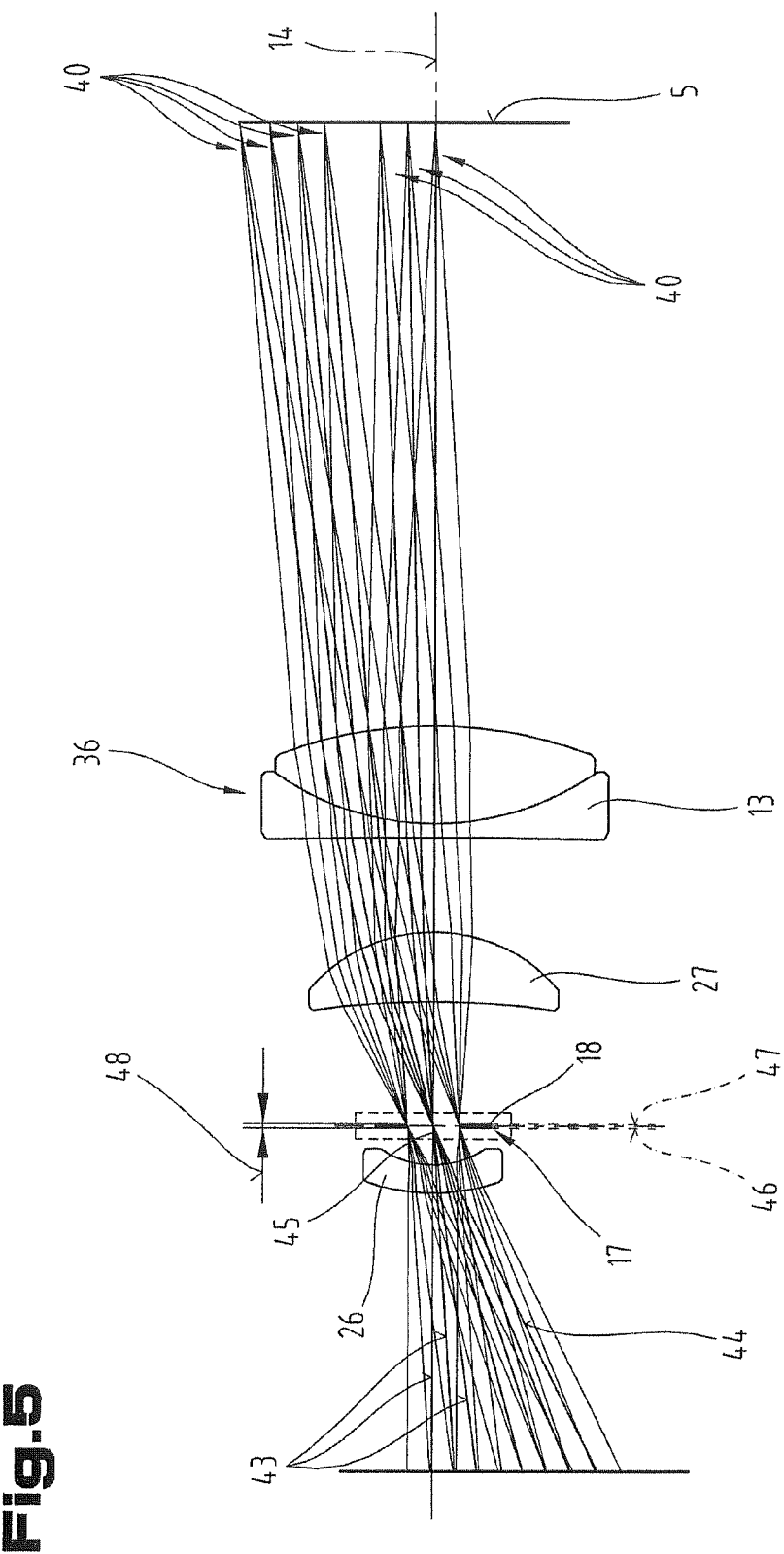

The heavily simplified schematics show:

FIG. 1 a sectional view through the objective as well as a part section through the image recording device in top view;

FIG. 2 an illustration of the beam profiles through the eyepiece of the far-optical device and the objective optics of the objective;

FIG. 3 a longitudinal section through a part of the eyepiece of a far-optical device and through an interface;

FIG. 4 longitudinal section through an objective according to the invention;

FIG. 5 an illustration of a beam profile through the objective optics of the objective.

It must first be stated that in the various embodiments described, identical parts have been marked with the same reference identifiers and the same parts descriptions. It is therefore possible to transfer the disclosures contained in the overall description to the identical parts with the same reference identifiers or the same parts descriptions. The selected positioning terms are used in the description, such as top, bottom, side etc., which refer directly to the described and the depicted figures and which can be correspondingly transferred to the new position in the event of a change in position. Furthermore, individual characteristics or combinations of characteristics from the various embodiments shown and described can present independent or inventive solutions, or solutions according to the present invention.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIG. 1 shows an objective 1 according to the invention in a position where it is connected to an image recording device 2. The image recording device 2 may for example be a photo camera or a movie camera. The objective 1 is also shown in a position connected to an eyepiece 7 of a far-optical device 4. An image 3 created by the far-optical device 4 is created on an image recording face 5 after having passed through the objective 1. The image recording face may for example be formed from a photographic film, an optoelectronic sensor or another purely other, optical sensor. The objective 1 has a housing 6, which can extend beyond the lens 13 nearest the far-optical device 4 in direction of the eyepiece 7 of the far-optical device 4. The housing 6 has a greater inner diameter 8 than the external diameter 9 of the eyepiece housing 10 is. The housing 6 may however only in an overlapping region 19 have a greater inner diameter 8 than the external diameter 9 of the eyepiece housing 10 is.

A connection of the housing 6 to the eyepiece 7 of the far-optical device 4 is embodied to be detachable and may e.g. be realized by a fixing device 21. Both an exit pupil 11 of the far-optical device 4 and an entrance pupil 12 of the objective 1 are inside the housing 6 of the objective 1. The objective 1 has at least one lens 13. It is nevertheless also possible that a plurality of lenses 13 is provided. The optical axis 14 of the objective 1 is arranged to be parallel to the optical axis 15 of the eyepiece 7 of the far-optical device 4 and to be parallel to the middle axis 16 of the eyepiece housing. It is preferably possible that the mentioned axes 14, 15, 16 form one single preferably straightly running axis. It is for example possible that a slight oblique position of the optical axis 14 of the objective 1 of less than 5° or a slight radial distance between the optical axes of less than 3 mm is compensated by an objective optics 35.

The exit pupil 11 of the far-optical device 4 and the entrance pupil 12 of the objective may lie on one single plane in a region 17 of the housing 6. The faces of the exit pupil 11 and the entrance pupil 12 preferably cover each other partly or completely, it is nevertheless also preferable if the exit pupil 11 and the entrance pupil 12 are arranged to be centered to the optical axis 14 and are arranged at the same position in longitudinal direction of the optical axis 14.

FIG. 2 shows a possible beam profile through the eyepiece 7 of the far-optical device 4 as well as through the objective 1 up to the image recording face 5 of the image recording device 2. It is for example possible that in or near a region 17, wherein also the exit pupil 11 and the entrance pupil 12 are disposed, a diaphragm 18 is arranged. The region 17 may be limited by two planes 46, 47 lying perpendicularly to the optical axis 14 and having a longitudinal distance 48 of less than 5 mm with respect to the optical axis 14. The diaphragm 18 may e.g. be formed from an aperture diaphragm. The objective 1 has a fixed focal length of less than 100 mm, preferably between 40 mm and 30 mm. A fixed focal length of 30 mm is advantageous between the objective optics 35 and the image recording face 5 of the image recording device 2. It is possible for the exit pupil 11 of the far-optical device 4 to be arranged between a negative lens 26 and a positive lens 27.

Those lenses 26, 27 may be standard negative and positive lenses for far-optical usages, freely available on the market. It is furthermore possible for the entrance pupil 12 of the objective 1 to be also arranged between the negative lens 26 and the positive lens 27.

The exit pupil 11 and the entrance pupil 12 may overlap each other at least in parts or are at spaced apart from each other at a minimal distance in longitudinal direction 15 of the objective 1, for example 0.001 to 5 mm, preferably 0.001 to 1 mm. The objective optics 35 may be composed of a negative lens 26 at the side facing the far-optical device, of a cemented element 36, being composed of a negative and a positive lens and arranged at the side facing the image recording device 2 and a positive lens 27 arranged there between. The beams 37, 38, 39 of a beam of rays 40 with peripheral rays 43, 44 entering the negative lens 26 of the objective optics 35 in a parallel manner, can form the exit pupil 11 and the entrance pupil 12 in the region 17. Peripheral regions of the beam of rays 40 can, if desired, for example be shaded by a diaphragm 18. It is possible that the positive lens 27 and the cemented element 36, which are also formed from standard composed negative and positive lenses deflect the beams 37, 38, 39 of the beams of rays 40 to the image recording plane 5 of the image recording device 2, where a real image 3 of a distant object 41 may be reproduced. It is possible for the exit pupil 11 of the far-optical device 4 to be modified by means of e.g. the lens 13, which can be the negative lens 26, it is in particular possible that its longitudinal position at the optical axis 15 is thereby displaced and it is consequently situated closer to or further away from the image recording face 5. The exit pupil 11 of the far-optical device may for example be located in front of the lens 13 or of the objective optics 35, but inside the housing 6.

FIG. 3 shows an interface 20, by means of which the housing 6 can be detachably connected to the eyepiece housing 10, detachably re-connectable to the far-optical device 4. The connections of such an interface 20 may for example be effected by means of a fixing device 21, such as for example by means of a thread, by means of a clamping device, by means of a press fit, by means of a clamping screw or a quick-locking device.

It is possible for the interface 20 to be connected to the eyepiece housing 10 of the eyepiece 7 of the far-optical device 4 in such a way, that an optimal centering of the housing 6 of the objective 1 is allowed. It is particularly possible for the interface 20 to be designed in such a way that it may be connected to several different types of eyepiece housings. The interface 20 can provide devices particularly cooperating with a centering device 33 and a longitudinal positioning device 34 at the housing 6. It is possible that the interface 20 is designed in such a way that a stop face 42 corresponding to a circular stop face 29 of the housing is arranged.

FIG. 4 shows a longitudinal section through the objective 1. It is for example possible for the objective 1 to be detachably connected to the image recording device by means of an objective bayonet 22. Such an objective bayonet 22 may be detachably connectable to the housing via a thread 23 preferably having a diameter 24 of 42 mm and a lead 25 of 0.75 mm. Generally, also other devices known from prior art are suitable for detachably connecting the objective bayonet to the housing. For this purpose, clamping, snap-lock or purely form-locking connections are imaginable.

It is possible for the objective to be at its housing 6 provided with a centering device 33 and/or a longitudinal positioning device 34 and/or a fixing device 21, which also may cooperate with corresponding matching parts at the eyepiece housing 10 or at the interface 20.

It is possible for the housing 6 to have at its end face 28 a circular stop face 29, by means of which e.g. an alignment with respect to the eyepiece housing 10 or the interface 20 may be carried out.

It is furthermore possible for the housing 6 to be designed to be bell-shaped and to have its smallest external diameter 30 at an end region 31 facing the image recording device 2. At least one interface for the electronic transfer of data 32 from and to the far-optical device 4 and/or image recording device 2 may be disposed at the housing 6.

FIG. 5 shows an exemplary beam profile through the objective optics 35. At least one intersection 45 of centroids 43, 44 at least of two beams of rays 40 may be situated inside the housing 6. It is of course also possible for a plurality of intersections 45 of centroids 43, 44 of a plurality of beams of rays to be situated inside the housing 6. The objective 1 may comprise at least one lens 13 having an optical axis 14. The intersection(s) 45 can be arranged on a side of a lens 13 nearest the image recording face 5 which side is opposite the image recording face 5. The objective optics 35 can be formed from a negative lens 26 at the side facing the far-optical device, from a cemented element 36, which may be composed of a negative and a positive lens and is disposed at the side facing the image recording device 2, and a positive lens 27 arranged in between. It is for example possible for the intersection(s) 45 to be arranged between the negative lens 26 and the positive lens 27.

In an exemplary variant, the intersection(s) 45 of the centroids 43, 44 of at least two beams of rays 40 can be situated inside the housing 6 in a region 17, which can be limited by two planes 46, 47 perpendicular with respect to the optical axel 14, which planes may have a longitudinal distance 48 with respect to the optical axis 14 of less than 5 mm.

The diaphragm 18 can at least partly be situated in this region 17.

The embodiments illustrated as examples represent possible variants of the device according to the invention or the adapter according to the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the design of the device according to the invention or the adapter according to the invention, they and their constituent parts are illustrated to a certain extent out of scale and/or on an enlarged scale and/or on a reduced scale.

| List of Reference Numerals | | | |
| --- | --- | --- | --- |
| 1 | Objective | 28 | End face |
| 2 | Image recording device | 29 | Stop face |

-continued

List of Reference Numerals

| 3 | Image | 30 | External diameter |
|---|---|---|---|
| 4 | Far-optical device | 31 | End region |
| 5 | Image recording face | 32 | Interface |
| 6 | Housing | 33 | Centering device |
| 7 | Eyepiece | 34 | Longitudinal positioning fixture |
| 8 | Inner diameter | 35 | Objective optics |
| 9 | External diameter | 36 | Cemented element |
| 10 | Eyepiece housing | 37 | Beam |
| 11 | Exit pupil | 38 | Beam |
| 12 | Entrance pupil | 39 | Beam |
| 13 | Lens | 40 | Beam of rays |
| 14 | Optical axis | 41 | Object |
| 15 | Optical axis | 42 | Stop face |
| 16 | Middle axis | 43 | Peripheral ray |
| 17 | Region | 44 | Peripheral ray |
| 18 | Diaphragm | 45 | Intersection |
| 19 | Overlapping region | 46 | Plane |
| 20 | Interface | 47 | Plane |
| 21 | Fixing device | 48 | Longitudinal distance |
| 22 | Objective bayonet | | |
| 23 | Thread | | |
| 24 | Diameter | | |
| 25 | Lead | | |
| 26 | Negative lens | | |
| 27 | Positive lens | | |

The invention claimed is:

1. An objective for an image recording device for reproducing an image, which is created by a far-optical device, on an image recording face, comprising:
   at least one lens of an objective optics; and
   a housing constituting a lens mount for the least one lens of an objective optics,
   said housing comprising a first end region corresponding to an image recording device, said first end region being detachably connectable to the image recording device,
   said housing comprising a second end region corresponding to a far-optical device, said second end region being detachably connectable to an eyepiece of the far-optical device and having a greater inner diameter than an exterior diameter of an eyepiece housing,
   wherein said second end region of said housing is designed for direct connection with the eyepiece housing,
   an exit pupil of the far-optical device arranged in the housing,
   an entrance pupil of the objective also arranged in the housing,
   said objective optics having an optical axis extending parallel to an optical axis of the eyepiece of the far-optical device and to a middle axis of the eyepiece housing,
      wherein said second end region of said housing is free from lenses of said objective optics over a length that is greater than a half of a total length of said housing.

2. The objective according to claim 1, wherein the objective has a fixed focal length of less than 100 mm, preferably between 40 and 20 mm.

3. The objective according to claim 1, wherein the objective has a fixed focal length of 30 mm.

4. The objective according to claim 1, wherein the housing has at least in an overlapping region a greater inner diameter than the exterior diameter of the eyepiece housing.

5. The objective according to claim 1, wherein the housing is detachably connectable to the far-optical device via a fixing device.

6. The objective according to claim 1, wherein said housing is detachably connectable to the image recording device via an objective bayonet.

7. The objective according to claim 6, wherein the objective bayonet is detachably connectable to the housing via a thread having a diameter of 42 mm and a lead of 0.75 mm.

8. The objective according to claim 1, wherein the exit pupil of the far-optical device is arranged between a negative lens and a positive lens.

9. The objective according to claim 8, wherein the entrance pupil of the objective is arranged between the negative lens and the positive lens.

10. The objective according to claim 1, comprising a centering device and a longitudinal positioning device arranged at the housing.

11. The objective according to claim 1, wherein the housing includes an end face embodied as a circular stop face.

12. The objective according to claim 1, wherein the housing comprises a bell-shaped configuration and has a smallest external diameter at said first end region facing the image recording device.

13. The objective according to claim 1, comprising at least one interface arranged at the housing for electronic data transfer from and to the far-optical device.

14. The objective according to claim 1, comprising a negative lens, a positive lens, and a cemented element, the objective optics is formed from the negative lens at the side facing the far-optical device, the cemented element, made of further negative and positive lenses, at the side facing the image recording device, and the positive lens arranged between the negative lens and the cemented element.

15. An objective for an image recording device for reproducing an image, which is created by a far-optical device, on an image recording face, comprising at least one lens of an objective optic and a housing constituting a lens mount for the least one lens of an objective optics, said housing comprising a first end region corresponding to an image recording device, said first end region being detachably connectable to the image recording device, said housing comprising a second end region corresponding to a far-optical device, said second end region being detachably connectable to an eyepiece of the far-optical device and having a greater inner diameter than an exterior diameter of an eyepiece housing, wherein said second end region of said housing is designed for direct connection with the eyepiece housing, said housing being arranged so that at least one intersection of centroids at least of two beams of rays is situated inside said housing, the objective including at least one lens of an objective optics, said objective optics having an optical axis extending parallel to an optical axis of the eyepiece of the far-optical device and to a middle axis of the eyepiece housing, the intersection is disposed on a side of the lens nearest the image recording face and opposing the image recording face, wherein said second end region of said housing is free from lenses of said objective optics over a length that is greater than a half of a total length of said housing.

16. The objective according to claim 15, wherein both an exit pupil of the far-optical device and an entrance pupil of the objective or the intersection of the centroids at least of two rays of beams is situated inside the housing in a region which is limited by two planes which are situated perpendicularly to the optical axis and have a longitudinal distance of less than 5 mm with respect to the optical axis.

17. The objective according to claim 16, wherein a diaphragm is arranged in the region.

\* \* \* \* \*